United States Patent [19]

Jackson

[11] 4,384,628
[45] May 24, 1983

[54] VEHICLE OVERLOAD DETECTOR

[76] Inventor: James M. Jackson, 5914 Moline Dr., Evansville, Ind. 47712

[21] Appl. No.: 256,408

[22] Filed: Apr. 22, 1981

[51] Int. Cl.³ .......................................... G01G 19/08
[52] U.S. Cl. ................................................. 177/137
[58] Field of Search ................ 177/136, 137, 138, 139

[56] References Cited

U.S. PATENT DOCUMENTS

| 595,715 | 12/1897 | Kaiser | 177/138 |
| 2,717,775 | 9/1955 | Jackson | 177/137 |
| 2,796,251 | 6/1957 | Donaldson | 177/137 |

Primary Examiner—Joseph W. Hartary
Attorney, Agent, or Firm—Warren D. Flackbert

[57] ABSTRACT

A vehicle overload detector characterized as mechanism which, after installation, is calibrated to a preselected initial setting, where upon loading a vehicle, the resulting metered deflection visibly advises the operator of any possible overload condition. Restated otherwise, the mechanism measures vehicle frame deflection, employing two cables, oppositely wound around a control pulley, for establishing the aforesaid initial setting and the deflected setting, respectively.

4 Claims, 4 Drawing Figures

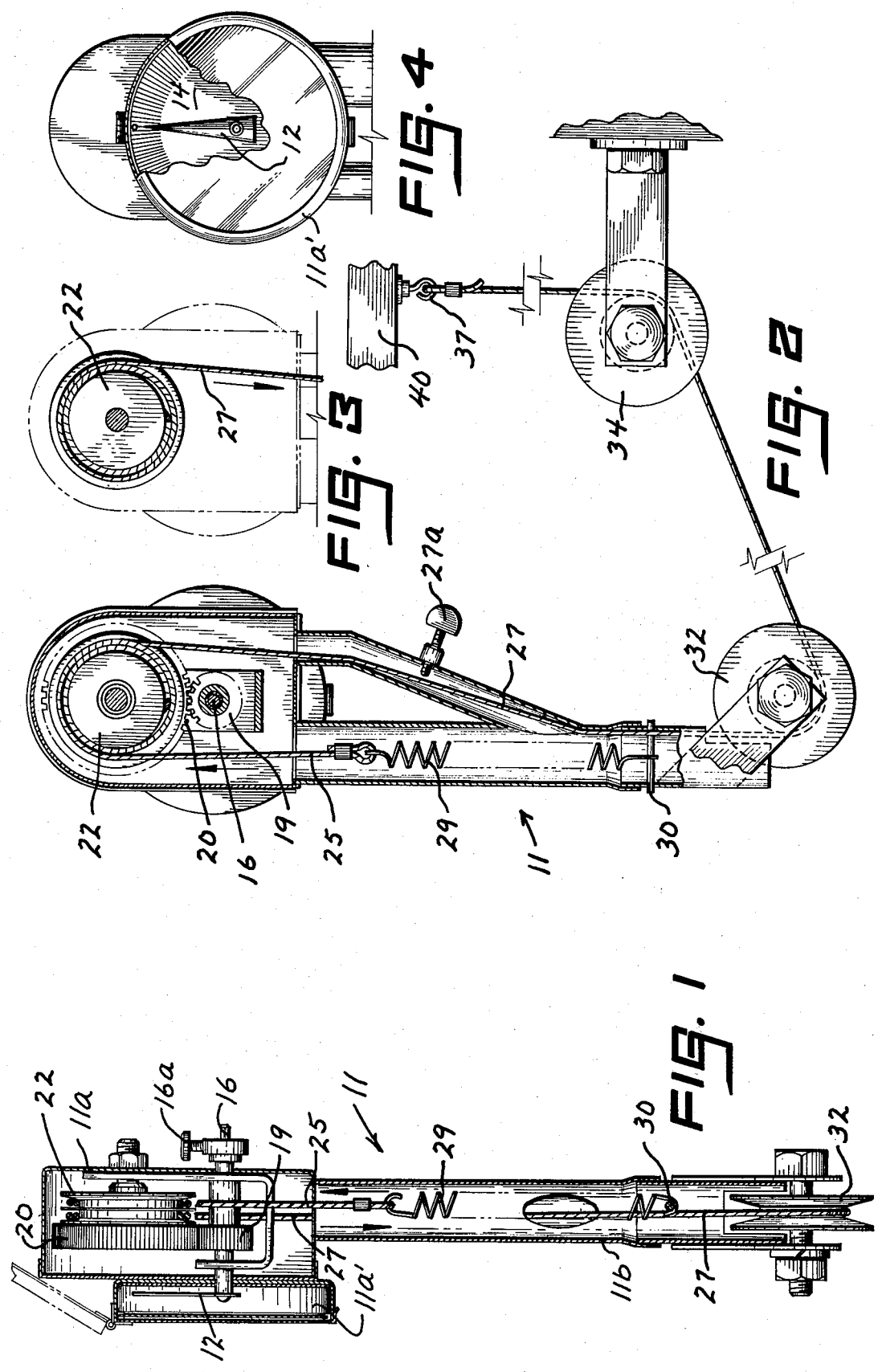

VEHICLE OVERLOAD DETECTOR

As is known, the overloading of a truck, such as a single axle and tandem tractor-trailer combinations, presents problems, both to the owners/operators and to governmental regulatory bodies. In other words, the owner/operator must be assured that the loaded truck is not overweight, either because of truck safety per se or by reason of exceeding road weight safety regulations. A need has arisen, therefore, for readily presenting an indication of truck load weight by mechanism which is secured to the truck frame, either at the site of manufacture or as a subsequent add-on feature.

The invention presents mechanism for accomplishing the preceding in the form of an overload detector which includes, in one invention form, two cables wrapped around a control pulley in opposite directions. One cable extends from the control pulley to a fixed axle position. The other cable extends, along associate pulleys, to a position beneath the load receiving area of the truck.

In operation, the first cable is caused to establish an initial or zero reading on a visual indicating device. The second cable, being responsive to the loaded weight of the truck, causes movement of the indicating device, whereby the operator/owner can ascertain whether or not a maximum load has been attained. In other words, by ready reference to the detector mechanism, the owner/operator can easily ascertain whether or not an overload situation exists.

The invention is adaptable for installation on virtually any form of truck and represents simplicity componentwise. Typically, the detector is disposed beneath the cab of the truck, while the cable which indicates load deflection is secured to the load receiving area, as beneath the fifth wheel.

In any event, the importance of the invention lies principally in the direction of cable winding on the control pulley, but such will become more apparent from the following description, taken in conjunction with the accompanying drawing, wherein FIG. 1 is a view in side elevation, partly in vertical section, showing a vehicle overload detector in accordance with the teachings of the invention;

FIG. 2 is a view in elevation, looking from right to left in FIG. 1, showing further details of the overload detector of such figure;

FIG. 3 is another view in elevation, in this instance showing one of the cables defining the invention; and, FIG. 4 is a view of a typical visual indicating device employed with the invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications of the illustrated device and such further applications of the principles of the invention as illustrated therein being contemplated as would normally occur to one skilled in the art to which the invention relates.

Referring now to the figures, the vehicle overload detector mechanism of the invention is disposed within a housing 11 defined by an upper portion 11a and an elongated bottom portion 11b. The upper portion 11a includes a windowed indicator enclosure 11a' which affords viewing access to a movable pointer 12 disposed in front of a calibration card 14 (see FIG. 4), such being selectively overlaid by a cover (shown in phantom in FIG. 1).

A shaft 16 on which the movable pointer 12 is carried extends through the upper portion 11a of the housing 11, where gears 19 and 20 operatively connect shaft 16 with a control pulley 22. A set screw arrangement 16a is provided on shaft 16 to establish a base setting of the pointer 12, as will become apparent from the discussion herebelow.

The control pulley 22 is, typically, presented in two adjacent portions separating cables 25 and 27. It should be understood that the free ends of each of such cables 25 and 27 are fixedly secured, as by welding, to the control pulley 22. In any event, cable 25 is wrapped in a clockwise direction around the control pulley 22, where the opposite end thereof is fixedly secured, through a spring 29, to a pin 30 disposed at the lower end of the bottom portion 11b of the overload detector mechanism. The spring 29 is tensioned prior to the installation of the detector unit for operation.

Cable 27 is wrapped counterclockwise around the control pulley 22, extending downwardly to an auxiliary pulley 32 mounted at the lower end of the bottom portion 11b of the housing 11 (also see FIG. 3). The path of the cable 27 is particularly evident in FIG. 2, where a tension mechanism 27a is provided for use during unit installation, to be discussed herebelow.

Typically, the cable 27 extends from auxiliary pulley 32 to another pulley 34 which is mounted on the differential (partly shown) of the vehicle. The cable 27 proceeds to be secured to a portion of the vehicle framework 40, as by a clamp assembly 37, disposed beneath the fifth wheel (not shown), i.e. under the load receiving area of the vehicle. In other words, the overall arrangement is such that the overload detector unit can be readily bolted to the cab of the vehicle and the cable 27 extended to any desired location susceptible to frame deflection due to the load.

In use, and as mentioned hereabove, after the detector is positioned onto the vehicle cab, cable 27 is urged to cause counterclockwise rotation of the control pulley 22, thereby, due to the clockwise winding of cable 25, tensioning the spring 29. At this time, the tension mechanism 27a is tightened so as to maintain the aforesaid tension on spring 29. The free end of cable 27 is then positioned, wherever desired, under the load bed of the vehicle.

The tension mechanism 27a is then released and the set screw arrangement 16a untightened so that the pointer 12 can be established at a preselected base or "zero" location on the calibration card 14. In other words, a "no load" setting is established. When a load is placed on the vehicle, pointer 12 moves and the maximum weight can be penciled on the calibration card 14, i.e. the vehicle is placed on a scale which weighs the load until the desired weight is achieved. Thereafter, as the vehicle is reloaded, the operator can visually determine whether the weight requirements are satisfied. Thus, a positive showing is made, and the mere viewing of the calibration card 14 visually indicates the weight status of the loaded truck.

It should be evident, therefore, that the overload detector of the invention functions to readily determine any possible overload issue, basically responsive to two cables oppositely wound around a control pulley for establishing an initial setting and a deflective setting, respectively. The mechanism may be varied within the spirit of the invention, including proportioning, the particular type of control pulley involved, the gearing arrangement for the visual pointer, the usage and position of the auxiliary or added pulley, and the like. Thus, the preceding should be considered illustrative and not as limiting the scope of the following claims:

I claim:

1. An overload detector for a vehicle having a framework comprising a housing mounting a single control pulley, a first cable having one end secured to and wrapped around said single control pulley in a clockwise direction and another end fixedly secured to said housing through tensioning means, and a second cable wrapped in a counterclockwise direction around said single control pulley having one end secured thereto and another end secured to said framework of the vehicle at a load receiving location remote from said housing, where said single control pulley operatively connects visual indicating means, where means are provided for selectively maintaining tension on said first cable, and where said selective tension maintaining means bears against said second cable.

2. The overload detector of claim 1 where said second cable passes around an auxiliary pulley mounted on the lower portion of said housing.

3. The overload detector of claim 1 where tightening means serve to selectively position said visual indicating means.

4. The overload detector of claim 1 where means are provided for establishing a base setting of said visual indicating means upon release of said selective tension maintaining means.

* * * * *